United States Patent [19]

Meyer

[11] 4,288,465
[45] Sep. 8, 1981

[54] PREPARING CHEESE HAVING LONGITUDINAL FIBROUS TEXTURE

[76] Inventor: Matthew Meyer, 1001 E. 17th St., Marshfield, Wis. 54449

[21] Appl. No.: 48,525

[22] Filed: Jun. 13, 1979

[51] Int. Cl.$^3$ .......................................... A23C 19/024
[52] U.S. Cl. .................................. 426/582; 426/506; 426/516; 426/517
[58] Field of Search ................. 426/582, 36, 516, 517, 426/506; 99/459, 452; 264/DIG. 47, 147, 154

[56] References Cited

U.S. PATENT DOCUMENTS

| | | | |
|---|---|---|---|
| 2,352,210 | 6/1944 | Kraft | 426/517 |
| 3,403,030 | 9/1968 | Pontecorvo et al. | 426/582 |
| 3,531,297 | 9/1970 | Kielsmeier et al. | 426/36 |
| 3,713,220 | 1/1973 | Kielsmeier et al. | 99/459 |
| 3,900,574 | 8/1975 | Warwick | 426/582 |
| 3,961,077 | 6/1976 | Kielsmeier | 426/582 |
| 3,966,970 | 6/1976 | Williams | 426/516 |

Primary Examiner—Joseph M. Golian
Assistant Examiner—George C. Yeung
Attorney, Agent, or Firm—Andrus, Sceales, Starke & Sawall

[57] ABSTRACT

In a process and apparatus for manufacturing an elongated cheese product, the extrusion of a heated mass of cheese is followed by a subsequent pulling or tensing of the extruded strand which develops a fibrous texture in the product and reduces the size of the strand. The pulling is carried out on a continuous basis by a tension applying device, downstream of the extruder, which may comprise a pair of drums around which the cheese strand is wrapped. The strand then passes down a cooling vat under tension from a second tension applying device which retains the properties of the strand as it cools. The second tension applying means may include pairs of driven rollers through which the cheese strand passes. After the pulling and cooling, the strand is cut in lengths suitable for packaging.

19 Claims, 6 Drawing Figures

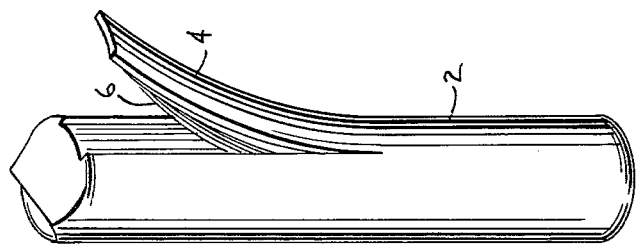
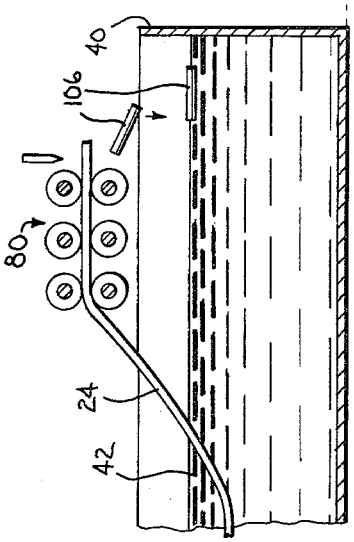
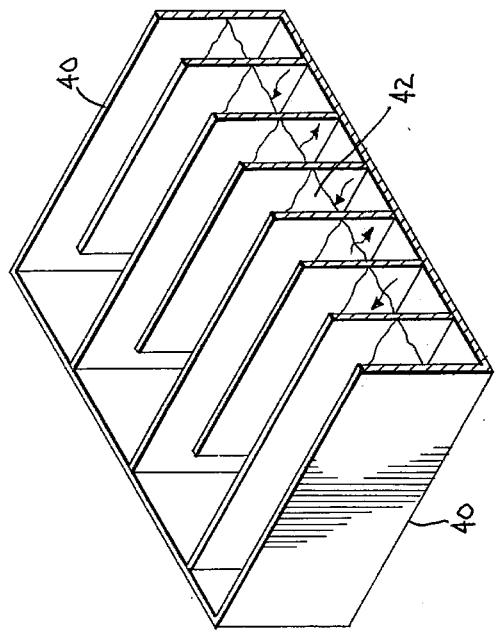
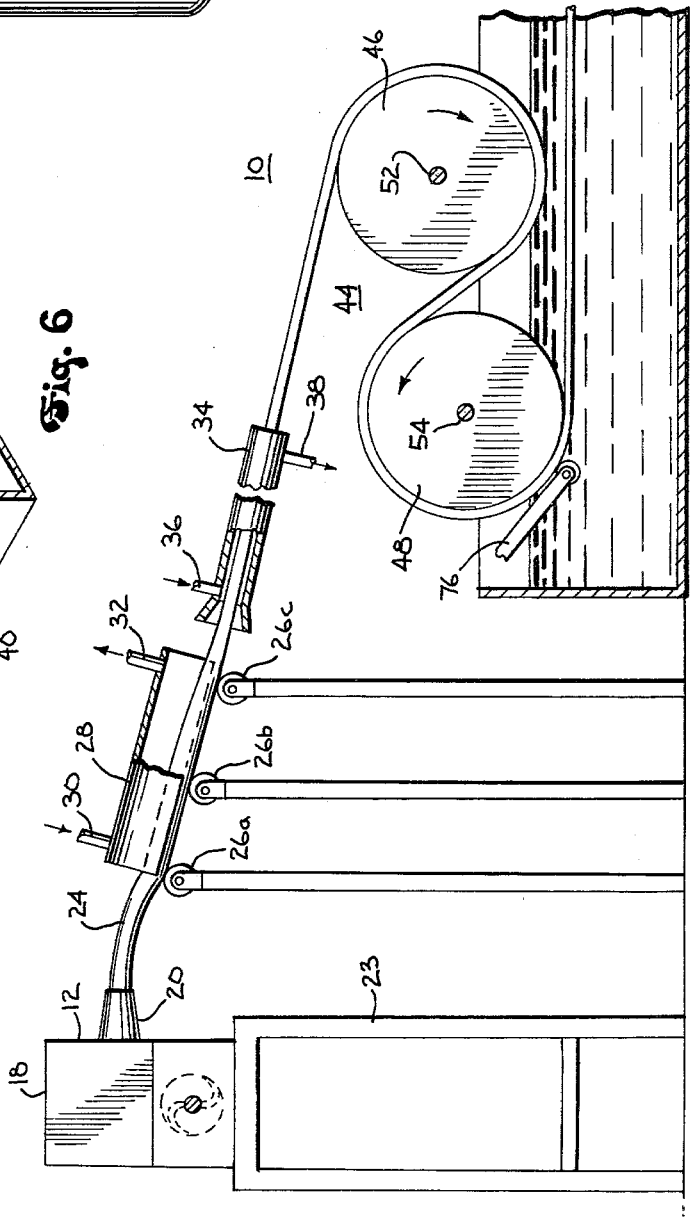
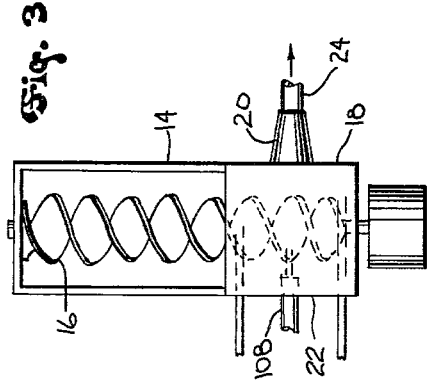

PREPARING CHEESE HAVING LONGITUDINAL FIBROUS TEXTURE

BACKGROUND OF THE INVENTION

The present invention relates to a process for manufacturing a cheese product. The cheese product is typically elongated in form, featuring a longitudinal fibrous texture which permits the product to be eaten by pulling off strips. While a variety of cheeses may be used, Italian type cheeses have been found useful in making the product because of their naturally stringy properties.

In the past, the manufacture of this type of product has generally been attempted by hand. A loaf of cheese was kneaded into a ribbon. Short lengths of the cheese were then pulled by hand or placed on a taffy puller. While this did provide such a product, these processes were not feasible from a commercial standpoint because of slowness, breakage of the cheese on the taffy puller, and for other reasons.

SUMMARY OF THE PRESENT INVENTION

It is, therefore, the object of the present invention to provide a highly efficient and effective process for producing a fibrous texture cheese product of uniform and highly satisfactory quality.

In the process of the present invention, a heated mass of cheese is extruded on a continuous basis. This is followed by a subsequent pulling or tensing of the extruded strand which is also carried out on a continuous basis. The cheese is cooled while it remains under tension, thereby to retain the fibrous properties and sizing produced by pulling the cheese strand.

To this end, a strand of cheese is extruded by an extruder. The continuously extruded strand is thereafter subjected to longitudinal tension, as by wrapping the strand around a pair of rotating drums. The pulling produced by the drums induces the fibrous texture in the strand and reduces its size by elongation. The cheese is cooled in conjunction with or after the elongation as by passing it down a water filled pipe.

The tension applied to the strand is maintained, while the cheese is further cooled in a vat by additional tension applying means which may comprise a plurality of driven rollers which grip the cheese strand between them. The strand of cheese so pulled and cooled is severed into consumer portions and packaged.

BRIEF DESCRIPTION OF THE DRAWING

FIG. 1 is a perspective view of a cheese product manufactured by the process of the present invention.

FIG. 2 is an elevational view of an apparatus for carrying out the process of the present invention. For clarity, the Figure is somewhat schematic in form.

FIG. 3 is a plan view of the extruder incorporated in the apparatus showing additional details thereof.

FIG. 6 is a fragmentary perspective view of a cooling water vat used in the apparatus.

DETAILED DESCRIPTION OF THE PREFERRED EMBODIMENT

Figure 4:
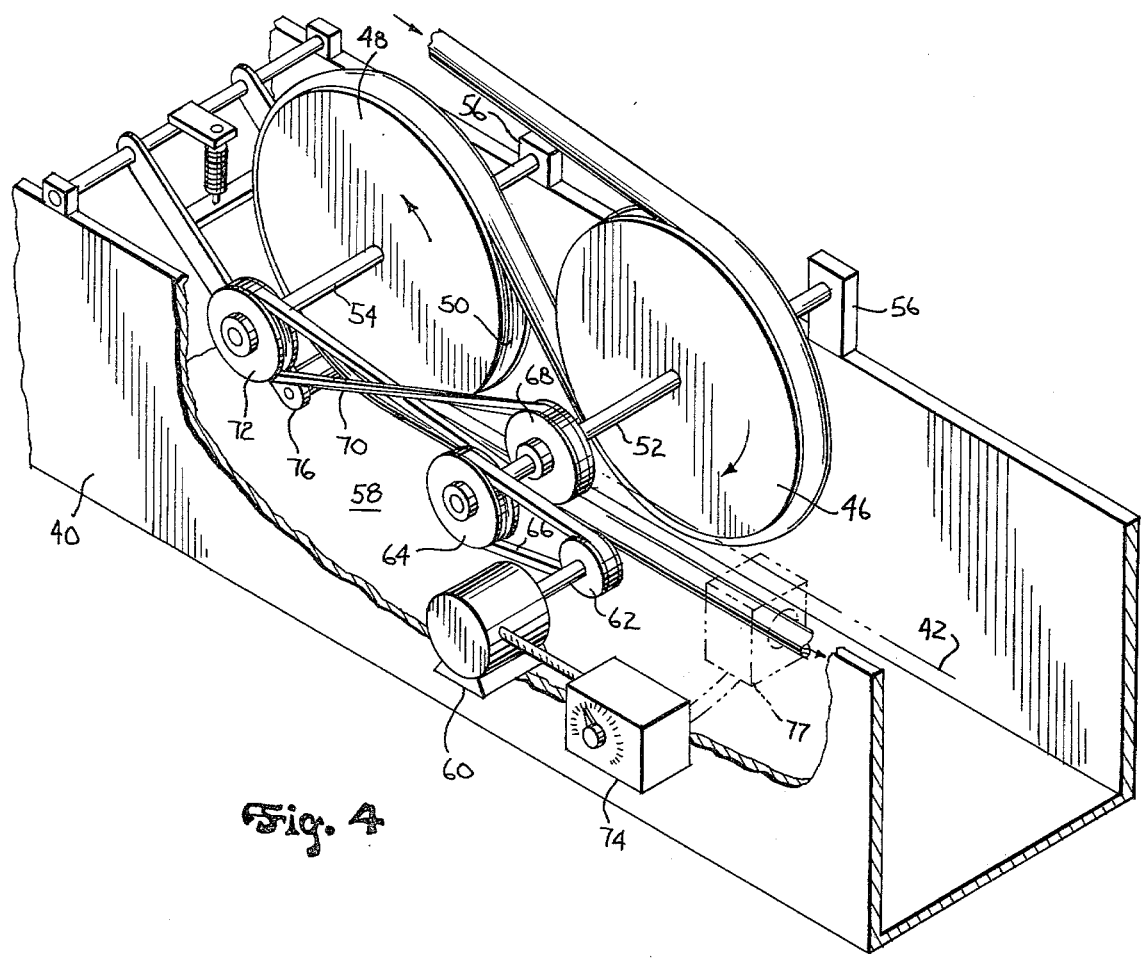
FIG. 4 is a perspective view of a tension applying means forming part of the apparatus.

FIG. 1 shows a cheese product 2 manufactured by the process of the present invention. Cheese product 2 is typically elongated in form having a diameter of approximately ⅜ to ⅞ inches. The product is characterized by a longitudinal fibrous texture property that permits portions 4 along the edge to be peeled off the central portion, as shown in FIG. 1. The stripping of portion 4 reveals the cheese fibers 6.

FIG. 2 shows apparatus 10 for making cheese product 2. Apparatus 10 includes extruder 12. Extruder 12 has bin 14 for receiving cheese as shown in FIG. 3. Typically, the manufacturing of the cheese to be processed by apparatus 10 will have proceeded to a point short of that at which it would otherwise be packaged. For example, in the case of Italian type cheeses, the cooking of the cheese, which converts the curds to a homogeneous plastic mass will be complete. The cheese placed in bin 14 is thus a viscous mass having a temperature of approximately 150° F.

Bin 14 contains auger 16 or other means for feeding the cheese into extrusion head 18 so that it may be extruded from nozzle 20. Extruder head 18 preferably includes hot water jacket 22 for maintaining the temperature of the cheese so that the cheese emerges from extrusion nozzle 20 at a temperature slightly lower than 150° F., for example about 145° F. As will be noted in FIG. 2, extruder 14 is typically elevated with respect to the other portions of apparatus 10 on stand 23.

The strand of cheese 24 emerging from extrusion nozzle 20 passes onto a series of rollers, 26a, 26b, and 26c for conveying the cheese strand to other portions of apparatus 10. To maintain the desired consistency and other properties of the cheese strand 24, a steam hood 28 is mounted over the rollers to play steam vapor or hot water supplied by conduits 30 and 32, onto the extruded strand as it passes over the rollers.

Strand 24 then passes into pipe 34. Pipe 34 contains a coolant supplied by conduits 36 and 38. The coolant is preferably a brine solution which both cools and commences the brining of the cheese necessary to obtain the desired flavor. The brine absorption is higher in the hot cheese emerging from extruder 12 and hood 28 than in the cheese after it has further cooled. The coolant also facilitates passage of strand 24 through the pipe. Additional cooling of strand 24 occurs in vat 40 containing brine 42.

Apparatus 10 includes means 44 for applying tension to extruded cheese strand 24. Tension applying means 44 includes a pair of drums 46 and 48 positioned in tandem, or one behind the other, in the path of extruded cheese strand 24. See FIGS. 2 and 4. Drums 46 and 48 contain one or more trough-like guides 50 on the periphery for receiving cheese strand 24. With the drums oriented as shown in FIG. 2, drum 46, or the rearward drum in the direction of extrusion, is rotated in a clockwise direction and forward drum 48 is rotated counterclockwise. For this purpose, drum 46 is mounted on shaft 52 and drum 48 is mounted on shaft 54. Shafts 52 and 54 may be journalled in bearings 56 on vat 40.

The drive 48 for drums 46 and 58 is shown in greater detail in FIG. 4. While a variety of variable speed drives may be used, drive 58 is shown as utilizing a d.c. motor 60. The output shaft of d.c. motor 60 is connected to pulley 62, which in turn is connected to pulley 64 on shaft 52 to drive drum 46 through belt 66. Pulley 68 is mounted on shafts 52 with pulley 64 and is connected through crossed belt 70 to pulley 72 mounted on shaft 54 of drum 48. Motor 60 may be energized by adjustable power supply 74 to control the speed of drums 46 and 48.

As shown most clearly in FIG. 2, cheese strand 24, as it emerges from pipe 34, is received in guide 50 at the top of drum 46. It proceeds around drum 46 in the direction of its rotation, emerging from the other side of drum 46 and is received in guide 50 of drum 48. From there it proceeds around drum 48 in the direction of its rotation and is discharged off the bottom of drum 48 to proceed along vat 40. As shown in FIGS. 2 and 4, brine 42 in vat 40 is preferably established at a level such that the lower portion of drums 46 and 48 are immersed in the water. A spring-loaded idler roll 76, shown in FIG. 4 is provided near the point at which cheese strand 24 is discharged from drum 48 to direct the cheese strand down vat 40.

With the strand 24 of cheese wrapped around drums 46 and 48, power supply 74 is adjusted so that the peripheral speed of drum 46 and 48 is greater than the speed of cheese strand 24 from extrusion nozzle 20. This exerts a tensile or pulling force on strand 24 which both induces the fibrous texture properties in the strand and reduces its size by elongation. Because the cheese is hot, most fiber production and elongation occurs in the region of steam hood 28 and coolant pipe 34, for example as strand 24 exits the steam hood and before it is significantly cooled in pipe 34. Some additional elongation may occur before and intermediate the drums.

As cheese is a natural product, the amount of tensile force required to produce the desired texture and size properties will vary with differences in the chemical composition of the milk used to make the cheese, the cheese manufacturing process and the temperature of the cheese. The degree of fibrous texture which can be produced is determined by the cheese itself. Enough tension is thus applied to maximize fibrous texture production in the particular cheese forming strand 24. If this tension is not sufficient to reduce the size of strand 24 to that necessary for consumer packaging, additional tension is applied for size reduction purposes. Thus, in actual production, tension is often established responsive to an inspection of the resulting product. The tension applied to cheese strand 24 will typically range between 20 and 40 pounds. Tension of the appropriate magnitude may reduce the diameter of an extruded cheese strand of 1½-2 inches down to about ⅝ to ⅞ as it is discharged from drum 48. If desired, the size of the cheese strand 24 discharged from drum 48 may be measured, as by sensor 77 and used to control the tension applied by drums 46 and 48. The cooling provided by the brine in pipe 34 and vat 40, as well as exposure to the air, reduces the temperature of cheese strand 24 to about 95° F. at discharge from the drums.

Figure 5:
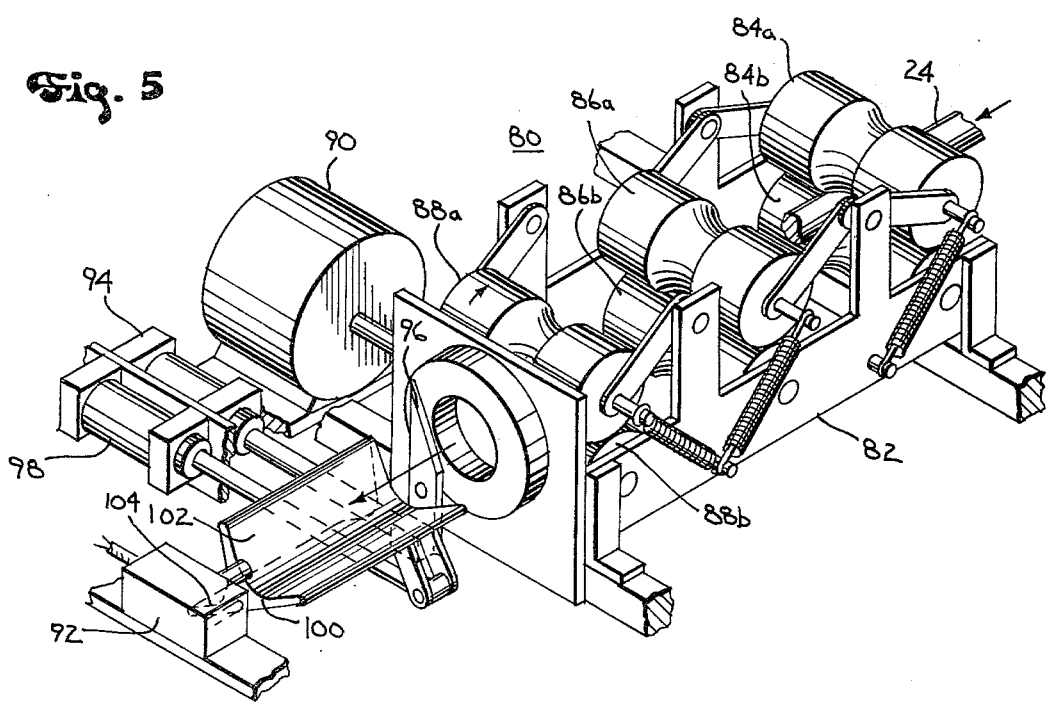
FIG. 5 is a perspective view of a tension maintaining means forming part of the apparatus.

Apparatus 10 includes a second means 80 for maintaining the tension on cheese strand 24 downstream of drums 46 and 48. Tension applying means 80 may also be mounted on vat 40. As shown most clearly in FIG. 5, means 80 includes a frame 82 on which are mounted a plurality of pairs of opposing rollers 84a and 84b, 86a and 86b, and 88a and 88b. Rollers 84b, 86b, and 88b are driven by an adjustable drive means 90 which may be similar to drive 74. Opposing rollers 84a, 86a, and 88a are spring-loaded and bear on rollers 84b, 86b and 88c. The rollers grip cheese strand 24 passing through the rollers and may be roughened for this purpose. The speed of drive 90 and rollers 84, 86 and 88 is adjusted so that the tension on cheese strand is continued after it leaves drum 48. It will be appreciated that other means, such as opposed moving belts may be used instead of rollers.

The tension applied to the strand by means 80 may be the same as that applied by means 44 but is usually less. Its purpose is to maintain the texture and size properties of strand 24 until it has cooled to the point where these properties become locked in. Because partially cooled cheese is elastic, strand 24 might resile from its stretched condition if the tension was not maintained, resulting in loss of desired texture and size properties. The additional tension also contributes to finer fiber development in strand 24.

The spacing of tension applying means 44 from extruder 12 and from tension applying means 80 is established in accordance with the properties and temperature of the cheese, the desired size of the cheese product 2, and other factors.

Means 80 may also include a device for cutting strand 24 into lengths suitable for packaging. For this purpose limit switch 92 is mounted so as to be struck by the strand 24 of cheese after it passes through rollers 88a and 88b. Limit switch 92 is connected to a solenoid 94 which operates cut-off knife 96 and to solenoid 98 which rocks tray 100 between a first position in which holder 102 receives the strand of cheese before and during cutting and a second position in which holder 104 receives cheese and holder 102 tips the previously cut cheese into vat 40. In the next cycle, holder 100 is rocked back in the other direction.

Brine 42 circulating in vat 40 cools strand 24 and the pieces 106 cut therefrom and continues the brining of the cheese. Brine 42 carries pieces 106 in the serpentine path shown in FIG. 6 to a packaging apparatus, not shown, which packages the pieces for commercial distribution. Injector 108 in extruder 12 may be used to inject a brine solution in the cheese as it is extruded to reduce brining times in vat 40.

Various modes of carrying out the invention are contemplated as being within the scope of the following claims particularly pointing out and distinctly claiming the subject matter which is regarded as the invention.

I claim:

1. A process for manufacturing a cheese product having defined longitudinal fibrous texture properties from a cheese capable of forming a fibrous texture when stretched, said process comprising the steps of:
   extruding a continuous strand of heated cheese;
   continuously applying a longitudinal pulling force to the continuous strand after extrusion to induce longitudinal fibrous texture properties in the heated strand and reduce the cross-sectional size of the strand; and
   cooling the strand at least after applying the longitudinal pulling force.

2. The process according to claim 1 further defined as maintaining tension on the strand during cooling.

3. The process according to claim 2, further defined as continuously applying a longitudinal pulling force to the strand.

4. The process according to claim 1 further including the step of severing the strand into predetermined lengths.

5. The process according to claim 2 further defined as maintaining tension on the strand at a lower magnitude than the fibrous texture inducing pulling force.

6. The process according to claim 1 wherein the pulling force applying step is further defined as applying sufficient pulling force to the continuous extruded strand to maximize the fibrous texture properties of the cheese.

7. The process according to claims 1 or 4 wherein the pulling force applying step is further defined as applying sufficient pulling force to reduce the size of the extruded strand to a desired size.

8. The process according to claims 1 or 4 wherein the pulling force applying step is further defined as applying a tensile force of up to 40 pounds to induce the fibrous texture properties.

9. The process according to claim 8 wherein the pulling force applying step is further defined as applying a tensile force of between 20 to 40 pounds.

10. The process according to claim 1 wherein the pulling force applying step is further defined as wrapping the continuous cheese strand around a pair of adjacent, rotating drums.

11. The process according to claim 2 wherein the tension maintaining step is further defined as gripping the cheese between a pair of opposed, moving cheese strand engaging means.

12. The process according to claim 1 wherein the pulling force applying step is further defined as applying tensile force in an amount determined by the size magnitude of the product after subjection to the pulling force.

13. The process according to claim 1 further defined as applying heat to the cheese strand after extrusion.

14. The process according to claim 1 further defined as cooling the cheese strand while subjecting it to the fibrous texture property inducing pulling force.

15. The process according to claim 1 further defined as cooling the strand by immersing it in fluid.

16. The process according to claim 15 further defined as cooling the strand by immersing it in a brine liquid.

17. The process according to claim 14 further defined as cooling the strand by applying a fluid to it.

18. The process according to claim 17 further defined as applying a brine liquid to the strand.

19. The process according to claims 1, 16 or 18 further defined as injecting brine into the cheese during the extruding step.

* * * * *